United States Patent [19]
Mayberry

[11] 3,825,818
[45] July 23, 1974

[54] ELECTROMAGNETIC TRANSDUCER FOR SENSING MOVEMENT OF A THREAD-LIKE OBJECT PAST A PREDETERMINED POINT

[76] Inventor: Leonard A. Mayberry, 735 Nancy St., Escondido, Calif. 92025

[22] Filed: June 29, 1972

[21] Appl. No.: 267,652

[52] U.S. Cl............ 324/34 R, 242/4 R, 235/92 CW, 324/34 D
[51] Int. Cl............................................. G01r 33/00
[58] Field of Search ............ 324/34 R, 34 PS, 34 D, 324/41; 242/4 R, 4 B; 235/92 CW

[56] References Cited
UNITED STATES PATENTS

| | | | |
|---|---|---|---|
| 3,039,052 | 6/1962 | Coffin et al. .................. | 235/92 CW |
| 3,345,753 | 10/1967 | Giardino ........................... | 324/34 D |

FOREIGN PATENTS OR APPLICATIONS

| | | | |
|---|---|---|---|
| 638,138 | 5/1950 | Great Britain .................... | 324/34 R |
| 1,573,747 | 7/1969 | Germany ......................... | 324/34 D |

OTHER PUBLICATIONS

Kelby et al.; Feather Contact Probe; IBM Tech. Bull. Vol. 13; No. 6; Nov. 1970; p. 1617.

*Primary Examiner*—Robert J. Corcoran
*Attorney, Agent, or Firm*—Fulwider, Patton, Rieber, Lee & Utecht

[57] ABSTRACT

An electromagnetic transducer for sensing the passage of a wire under a probe connected to the transducer and generating a signal in response thereto. The probe configuration is such that as the end of the probe falls off the trailing side of the wire, a relatively constant output signal is generated regardless of the speed of movement of the wire. An electromagnet is continuously energized to attract an armature connected to the probe and the pressure of the end of the probe against a reference surface is adjusted by varying the spacing between the electromagnet and the armature.

5 Claims, 5 Drawing Figures

PATENTED JUL 23 1974
3,825,818
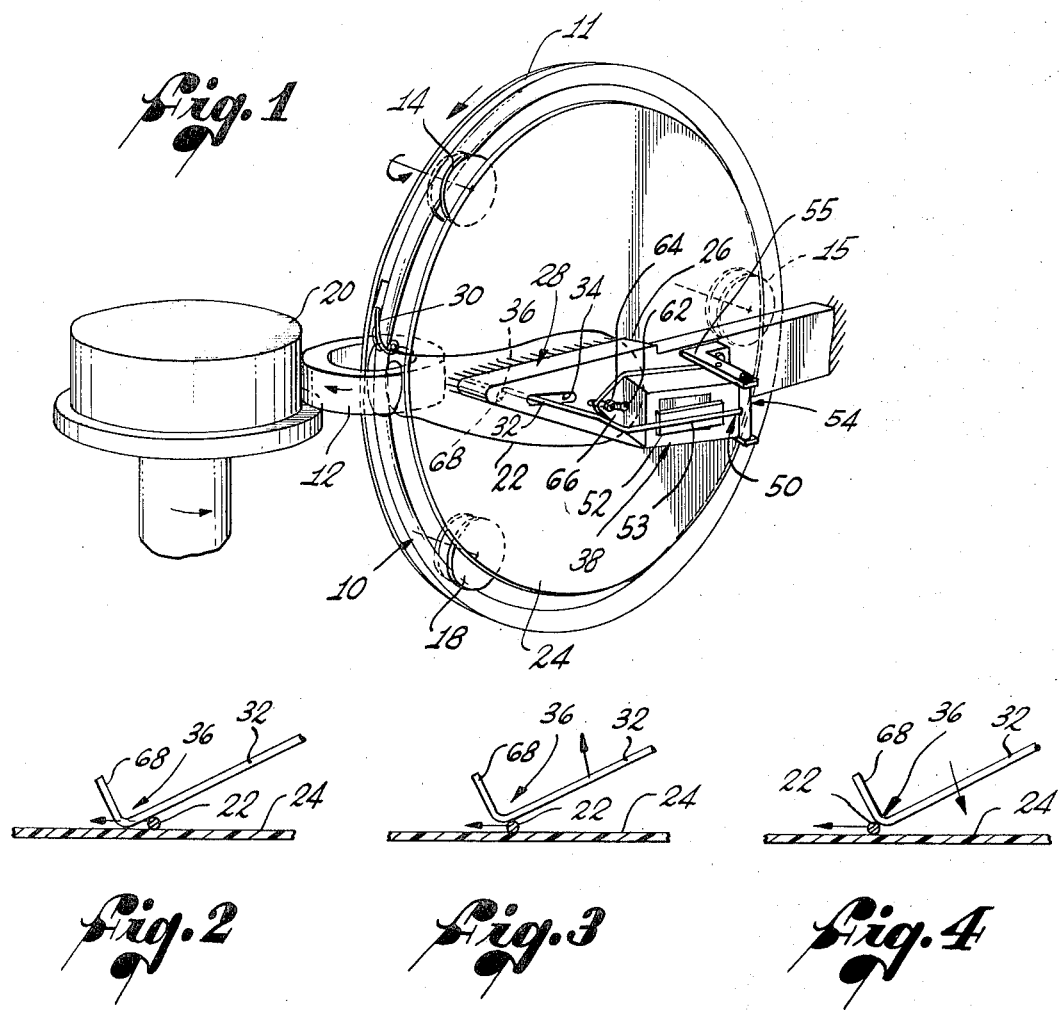
Fig.1
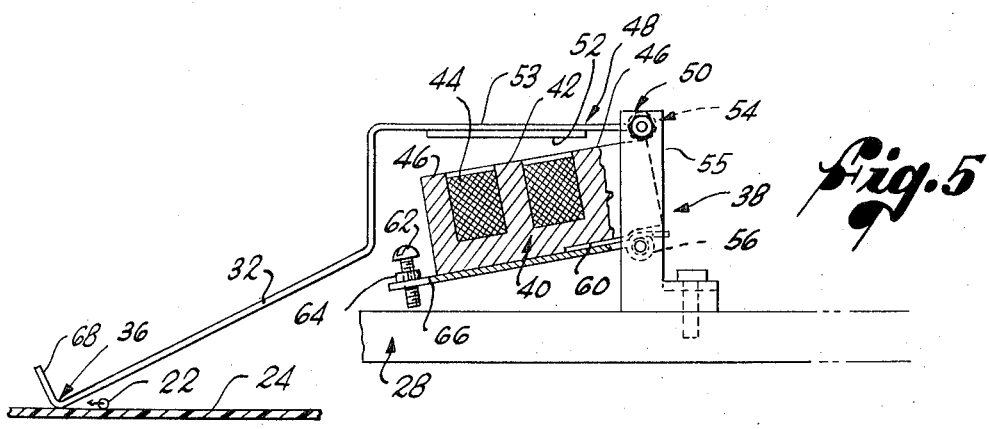
Fig.2
Fig.3
Fig.4
Fig.5

3,825,818

ELECTROMAGNETIC TRANSDUCER FOR SENSING MOVEMENT OF A THREAD-LIKE OBJECT PAST A PREDETERMINED POINT

BACKGROUND OF THE INVENTION

1. Field of the Invention

The present invention relates generally to electromagnetic transducers and, more particularly, to such a transducer used as in a turns counter for detecting the passage of a fine wire in a coil winding machine.

2. Description of the Prior Art

In the coil winding field, a common method of counting the turns wound on the coil is to count the revolutions of some machine element revolving at the same rate as the coil being wound. However, for most toroidal coil winders, the mechanical configuration of the machine is such that there is no direct correspondence between the rotation of any machine element and the number of turns wound on the toroidal coil. Therefore, some other means of counting turns must be used.

A typical toroidal coil winding machine creates a relatively large loop of wire which is carried on a backup plate and then drawn across the plate and around the toroid core. One turn is wound around the core each time the large loop is drawn across the backup plate.

In this type of toroidal coil winder, a common turns counting arrangement is to provide an electrical contact type of sensor in which a feeler wire remains in contact with the backup plate and as the wire is drawn across the plate and past the feeler, the electrical circuit is interrupted and the interruptions counted as turns wound on the toroid core. However, reliable operation of the contact type sensor is difficult to maintain in that the electrical contact between the feeler wire and the backup plate must be kept perfectly clean and free of dirt or arcing corrosion due to the continuous interruption of the electrical circuit. Additionally, there is a tendency for the end of the feeler to bounce on the backup plate generating erroneous signals. These problems can be reduced by increasing the pressure of the feeler on the backup plate but the added pressure leads to more frequent instances of wire breakage, particularly when relatively fine wire is used.

Another turn counting arrangement for a toroidal coil winder utilizes photoelectric sensors in which the passage of the wire interrupts a small beam of light. However, the cost of this type of coil winding system is normally prohibitive and the system itself cannot be installed on many commonly available coil winding machines.

Thus, there has long been a need in the field of coil winding, particularly toroidal coil winding, for a reliable and inexpensive turn counting system. The present invention satisfies that need.

SUMMARY OF THE INVENTION

The electromagnetic transducer of the present invention provides a reliable means for sensing the passage of fine, thread-like objects, such as wires, past a predetermined point. The invention finds particular application as a turns counter for toroidal coil winding machines.

The transducer of the invention is able to produce relatively constant amplitude output signals regardless of the speed of movement of the wire under a probe associated with the transducer. The transducer is therefore highly reliable for use as a turns counter for a toroidal coil winder whose speed of operation typically runs from slow, hand operation to start a coil to high speed machine operation. It should be appreciated that the principles of the transducer operation has wide application beyond the presently preferred and illustrated embodiment as a turns counter.

In the presently preferred embodiment of the invention, an electromagnet is continuously energized to attract a pivotally mounted armature. A sensing probe in the form of a thin rod extends from the armature into physical contact with the backup plate. The pressure exerted by the probe on the backup plate can be advantageously varied by adjusting the distance between the electromagnet and the armature. As a wire passes under the probe, the resultant movement of the armature produces changes in the magnetic attraction between the electromagnet and the armature which produces a corresponding voltage fluctuation across the coil of electromagnet which can be sensed as electrical signals to count turns.

The sensing probe is shaped so that a portion of the rod near its end is inclined with respect to the plane of the backup plate and as a wire passes under the inclined portion, the end of the probe is only gradually moved away from the backup plate until the wire is past the end of the probe. The wire movement under the inclined portion of the probe produces a leading output signal which is highly dependent of the speed of the wire past the probe.

The end of the probe then drops off of the trailing side of the wire back to the backup plate relatively quickly. This movement produces a trailing output signal which is remarkably constant in amplitude regardless of the speed of movement of the wire. Using the trailing output signal for turn counting then produces a highly reliable and consistent turn count regardless of the operating speed of the machine.

Thus, while the presently preferred embodiment of the invention is employed as a turns counter for a toroidal coil winder, it will be appreciated that the transducer principle can be employed in a wide variety of applications where small movements must be reliably sensed over a wide range of speeds of movements of wire-like objects.

DESCRIPTION OF THE DRAWING

FIG. 1 is a pictorial perspective view of a generalized toroidal coil winder with some oversized parts for visual clarity and a presently preferred embodiment of the electromagnetic transducer of the invention in its operating position thereon;

FIG. 2 is a detail drawing of a wire passing under the inclined portion of the probe;

FIG. 3 is a detail drawing of the wire approaching the end of the probe;

FIG. 4 is a detail drawing of the wire past the end of the probe; and

FIG. 5 is a detailed, partially sectioned, side view of the presently preferred embodiment of the electromagnetic transducer of the invention.

DESCRIPTION OF THE PREFERRED EMBODIMENT

Turning now to the drawings, and particularly FIG. 1 thereof, the presently preferred embodiment of the electromagnetic transducer of the invention is shown in the form of a turns counter for a toroidal coil winder, The winder itself forms no part of the present invention and is briefly described here only for the purpose of establishing an operating environment for the illustrated embodiment of the invention.

The general operation of a type of toroidal coil winder is illustrated in FIG. 1, with certain parts, such as the toroid core, oversized for visual clarity. Basically, a circular shuttle 10 with an outer peripheral groove 11 is filled with the wire to be wound around a toroid core 12. The shuttle 10 passes through the center of the toroid core 12 and is mounted for continuous rotation by means of rollers 14, 16 and 18 which bear against the inside periphery of the shuttle. One of the rollers, 14 for example, is driven to rotate the shuttle 10. The toroid core 12 is supported by means of three rollers, only one of which (20) is shown, which bear against the outside diameter of the core 12.

Generally, the toroidal coil winder operates by pulling a relatively large loop of wire 22 across a backup plate 24 and around an outside end 26 of a brush 28 with its bristles in contact with the backup plate. As the leading end of the loop of wire 22 passes through the center of the toroid core 12, the end of the wire is held in place on the shuttle 10 by means of a wire dispensing slider 30, slidably mounted within the groove 11 of the shuttle. The slider 30 maintains sufficient tension on the wire 22 so that the loop is pulled past the bristles of the brush and also past a probe 32 extending through an aperture 34 in the top of the brush 28. As the shuttle 10 continues to rotate, the loop of wire 22 is tightened around the core 12 and the slider 30 slips within the groove 11 of the shuttle to dispense a length of wire sufficient to make another turn. As turns of wire 22 are placed on the toroid core 12, the toroid supporting roller 20 rotates the core itself to evenly distribute the turns.

The probe 32 is attached to an electromagnetic transducer 38 constructed in accordance with the present invention and, as the wire 22 passes under a tip 36 of the probe 32, a signal is generated indicating that another turn has been placed on the toroid core 12. It will be appreciated that counting the turns at this point is necessary since there is no definite one-to-one correspondence between the rotation of any part of the coil winder and the number of turns which are placed on the toroid core 12.

While the electromagnetic transducer 38 is shown and described as used on a toroidal coil winder, it should be appreciated that the basic principle involved, that of electromagnetic sensing of the passing of a relatively thin thread-like object, such as a wire, may be used in numerous other applications. Thus, the subject of the invention is the principle of operation of the transducer 38 and not the operation of the coil winder.

The physical configuration of the presently preferred embodiment of the transducer of the invention is best seen in FIG. 5. The transducer 38 includes an electromagnet assembly 40 which includes a center pole piece 42 surrounded by a coil 44 which is in turn surrounded by an outer pole piece 46 completely enclosing the coil. The magnet coil 44 is conventionally energized by direct current with the resultant magnetic field attracting a pivotal armature 48 mounted in close proximity with the gap area between the pole pieces 42 and 46 of the electromagnet assembly 40. The armature 48 is pivoted about one end 50 in any convenient manner and the probe 32 is attached to the opposite end of the armature.

In the illustrated embodiment of FIGS. 1 and 5, the armature 48 is a rectangularly shaped piece 52 of magnetic material and a relatively thin, stiff rod 53 which overlies and is attached to the rectangular piece 52. The end of the rod 53 serves as the end 50 of the armature 48 which is attached to a conventional tubular pivot assembly 54 on a pair of mounting brackets 55. It will be appreciated that the exact construction of the pivot assembly 54 and the attachment of the rectangular piece 52 to the rod 53 may be effected in any well known conventional manner. Furthermore, while the armature 48 described is advantageously of lightweight to improve response, many other configurations are possible and well known to those skilled in the art.

In the illustrated embodiments shown in FIGS. 1 and 5, the probe 32 is formed by a continuation of the rod 53 and is bent in any convenient manner so that the end 36 of the probe passes through the aperture 34 in the brush 28 and into physical contact with the backup plate 24.

As mentioned above, the pressure of the end 36 of the probe 32 on the backup plate 24 is advantageously and simply varied by adjusting the relative positions of the electromagnet assembly 40 and the armature 48. To this end, one end 56 of the electromagnet assembly 40 is pivotally mounted on the pair of brackets 55. The electromagnet assembly 40 is pivotally urged downwardly toward the top of the brush 28 by any conventional means such as a coil spring 60. The relative position of the electromagnet assembly 40 is adjusted by means of an adjusting screw 62 and locknut 64 through a mounting plate 66 for the electromagnet assembly 40. The adjusting screw 62 is used to push the mounting plate 66 and electromagnet assembly 40 upwardly toward the armature 48 against the spring 60.

In addition to directing the end 36 of the probe 32 through the aperture 34, the probe is shaped to incline the probe with respect to the backup plate 24, as illustrated in FIG. 5. The end 36 of the probe 32 is preferably formed by a rounded ninety degree bend in the rod 53 to create an outer short section 68 with a relatively steep incline with respect to the plane of the backup plate 24.

As mentioned above, this configuration for the probe 32 results in obtaining reliable and substantially constant output pulses regardless of the speed of movement of the wire 22 under the end 36 of the probe. This effect is best illustrated in FIGS. 2, 3 and 4 which show the relationship between the end 36 of the probe 32 and the wire 22 as the wire passes between the end of the probe and the backup plate 24. In particular, as the wire 22 encounters the inclined portion of the probe 32, the end 36 of the probe is raised relatively slowly from the surface of the backup plate 24. As can be seen in FIGS. 2 and 3, the wire 22 moves a considerable distance in order to raise the end 36 of the probe 32 to its maximum height above the surface of the backup plate 24.

It will be appreciated by those skilled in the art that, when this relatively slow motion is transferred to the armature 48 of the electromagnetic transducer 38, the magnetic interaction between the electromagnet 40 and the armature 48 is changed relatively slowly, producing fluctuations in the magnetic field which, as is well known in the art can be detected in the form of electrical signals of relatively low amplitude. The signal obtained when the wire 22 is passing under the inclined portion of the probe is called herein the "leading output signal". Should the wire 22 be moving relatively fast the end 36 of the probe 32 will be raised from the surface of the backup plate 24 sufficiently rapidly to cause a leading output signal of greater magnitude. Thus, it can be seen that the amplitude of the leading output signal is highly dependent upon the speed of movement of the wire 22 under the end 36 of the probe 32.

However, as shown in FIG. 4, when the wire 22 has passed the end 36 of the probe 32, the end falls off of the trailing side of the wire 22 relatively rapidly and, the rapid return of the end 36 of the probe 32 to the surface of the backup plate 24 causes corresponding rapid fluctuations in the magnetic field in the electromagnet 40 resulting in corresponding rapid fluctuations in the voltage across the coil of the electromagnet which can be detected by conventional means as an output signal of relatively high magnitude. The signal obtained when the end 36 drops off the wire 22 is called herein the "trailing output signal".

It has been demonstrated that the magnitude of the trailing output signal remains substantially constant regardless of the speed of movement of wire 22. Naturally, there is some variation in the magnitude of the trailing output signal due to the speed of movement of the wire 22 but, during practical tests, it was determined that the magnitude of the trailing output signal varied only between 200 and 250 millivolts between hand operation and high speed machine operation while the leading output signal varied between less than 1 millivolt to 200 millivolts between hand operation and high speed machine operation. Thus, the trailing output signal remains substantially constant compared to the leading output signal over all practical operating speeds of the coil winder.

In order to best utilize the output signals of the electromagnetic transducer of the invention, it is necessary to use the trailing output signal as the indication of a counted turn. This may be accomplished by the use of any well known and conventional electronic circuitry for differentiating between those signals and such electronic circuitry forms no part of the present invention.

Thus, the electromagnetic transducer of the present invention provides a highly reliable and improved means for counting turns in a coil winder of any configuration in that the turn is counted with relatively little pressure between ends 36 of the probe 32 and the backup plate 24 thereby reducing significantly the cause of wire breakage in coil winding operations. Furthermore, since only slight physical movement of the end 36 of the probe 32 is necessary to generate the count signal, with no electrical contacts being interrupted, the transducer of the invention is highly reliable and practically impervious to normal wear. The physical configuration of the electromagnet assembly permits simple and easy adjustment of the pressure between the end of the probe 36 and the backup plate by simple screw adjustment and the selection of the trailing output signal results in a substantially constant output count signal over the entire practical operating range of the coil winder for which the illustrated embodiment was designed.

While a particular electromagnetic transducer configuration has been illustrated and described in detail, it should be appreciated that the principles of operation of the transducer are applicable to a wide range of sensing applications. Therefore, the scope of the invention is not to be limited except by the following claims.

I claim:

1. An electromagnetic transducer for sensing the movement of a thread-like object past a predetermined point, said transducer comprising:
   electromagnet means for producing a magnetic field in response to energization of said electromagnet means;
   armature means disposed in said magnetic field in close proximity to said electromagnetic means, said armature being urged toward said electromagnet means by said magnetic field; and
   probe means attached to said armature means with an end of said probe means being urged into physical contact with a reference surface, the passage of said thread-like object between said end of said probe means and said reference surface causing movement of said end of said probe means and corresponding movement of said armature means, the relative movement between said armature means and said electromagnet means causing variations in said magnetic field which may be sensed as a signal indicative of the passage of said thread-like object, said probe means further having a gradually inclined portion with respect to said reference surface between said end of said end and said armature means and a steeply inclined portion thereafter and said thread-like object passes under said gradually inclined portion first before passing under said end, said end being first moved relatively slowly away from said reference surface and then moved back to said reference surface relatively quickly following the passage of said thread-like object, whereby said variations in said magnetic field produce a substantially larger signal as said end moves back to said reference surface.

2. The electromagnetic sensor defined in claim 1 including:
   means for adjusting the proximity between said armature means and said electromagnet means for varying the pressure between said end of said probe means and said reference surface and varying the signal produced by said electromagnet means.

3. For use in a coil winder wherein the passing of a loop of wire past a predetermined point may be used as in indication of a turn wound on the coil, a turns counter comprising:
   electromagnet means for producing a magnetic field in response to energization of said electromagnet means;
   armature means disposed in said magnetic field in close proximity to said electromagnetic means said armature means being urged towards said electromagnet means by said magnetic field; and
   probe means attached to said armature means, said probe means having an end which is urged into physical contact with a reference surface at said predetermined point, the passage of said loop of wire between said end of said probe means and said reference surface causing movement of said end of said probe means and corresponding movement of said armature means, the resultant relative movement between said armature means and said electromagnet means causing variations in said magnetic field which may be sensed as a signal indicative of the passage of said loop of wire, said end of said probe means further having a leading portion thereof which is gradually inclined to the plane of said reference surface and a trailing portion which is relatively steeply inclined to the plane of said reference surface, and said wire loop passes first under said gradually inclined portion to generate a leading output signal, and then under said trailing portion to generate a trailing output signal, said trailing output signal being substantially greater in magnitude than said leading output signal.

4. The turns counter defined in claim 3 wherein:
said trailing output signal is used to indicate a turn wound on said coil.

5. The turns counter defined in claim 3 including:
means for adjusting the proximity between said electromagnet and said armature means for varying the pressure between said end of said probe means and said reference surface and varying the signal produced by said electromagnet means.

* * * * *

PO-1050
(5/69)

UNITED STATES PATENT OFFICE
CERTIFICATE OF CORRECTION

Patent No. 3,825,818          Dated July 23, 1974

Inventor(s) LEONARD A. MAYBERRY

It is certified that error appears in the above-identified patent and that said Letters Patent are hereby corrected as shown below:

Column 2, line 21, after "can be sensed" the words --by conventional means-- should be inserted; line 25, "theinclined" should be --the inclined--.

Column 3, line 2, "," should be --.--.

Column 5, line 3, insert --,-- after "art".

Column 6, line 54, "in" should be --an--.

Signed and sealed this 29th day of October 1974.

(SEAL)
Attest:

McCOY M. GIBSON JR.          C. MARSHALL DANN
Attesting Officer          Commissioner of Patents